April 17, 1928.  
D. W. SHIEK  
1,666,267  
WRITING MACHINE  
Filed April 24, 1925  
17 Sheets-Sheet 1

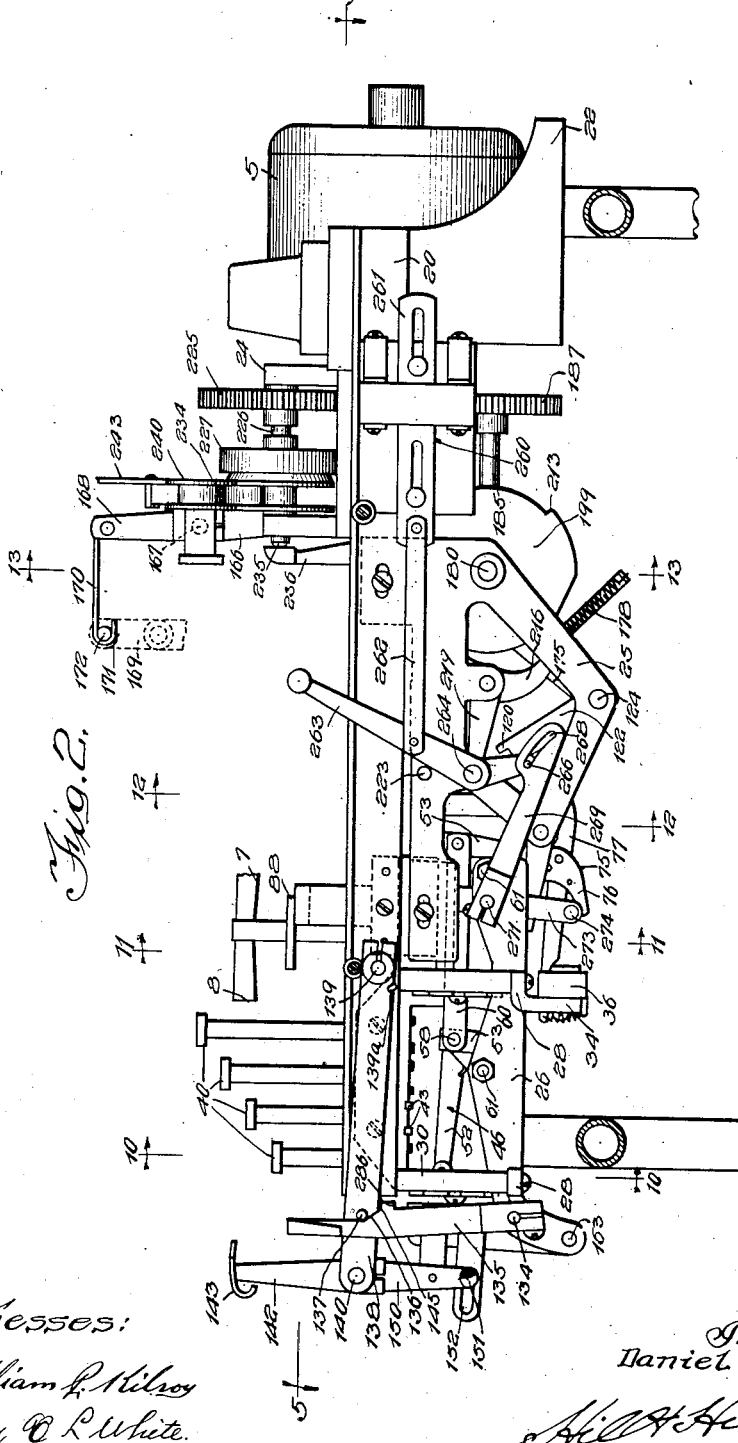

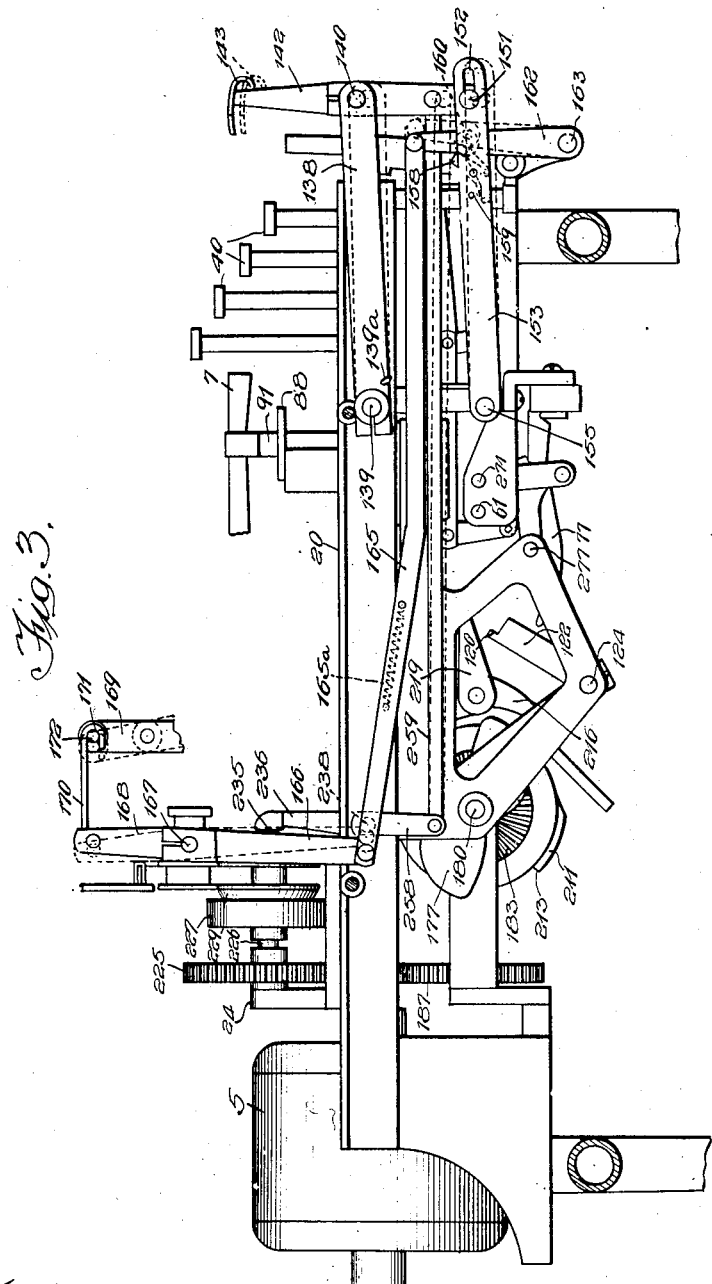

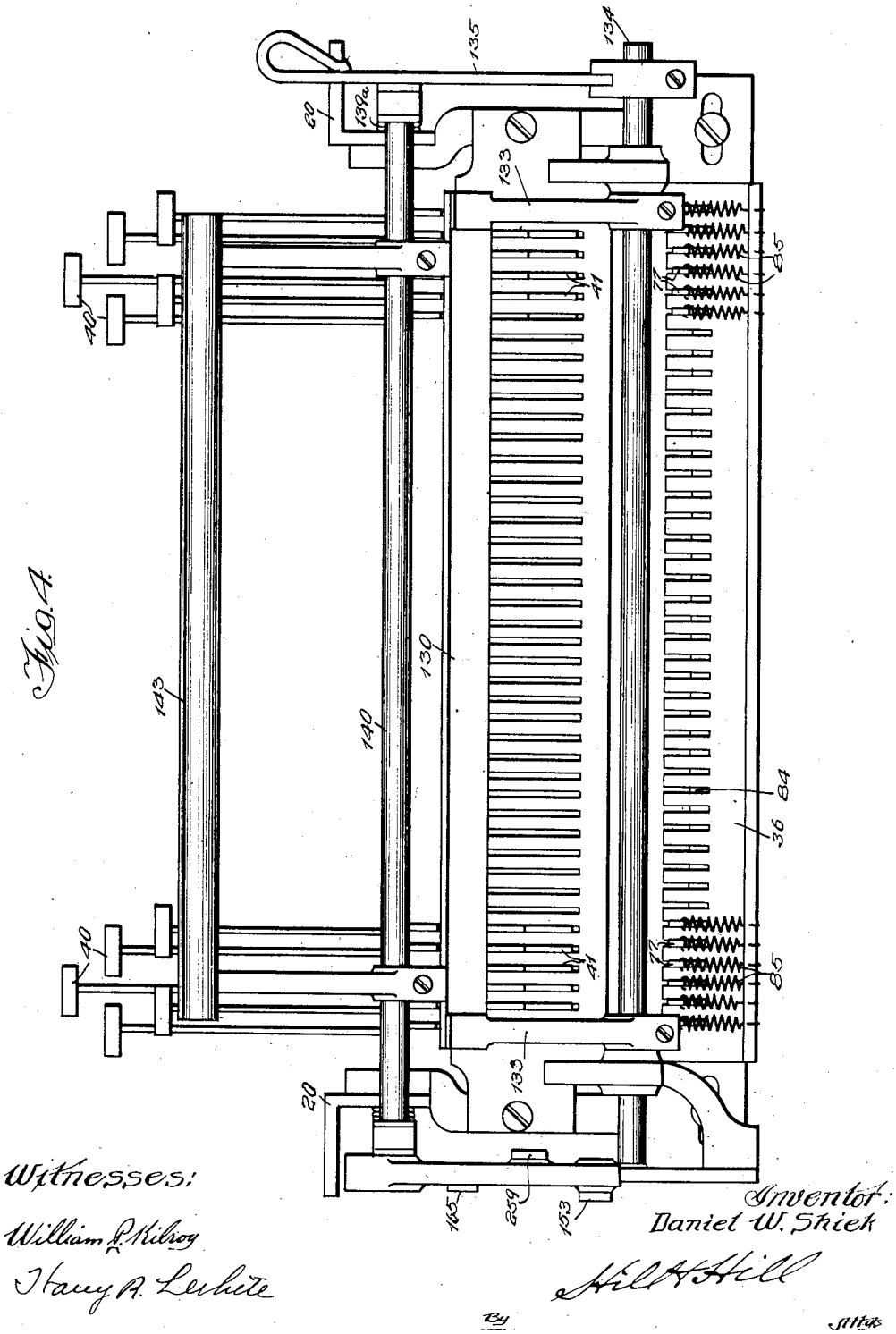

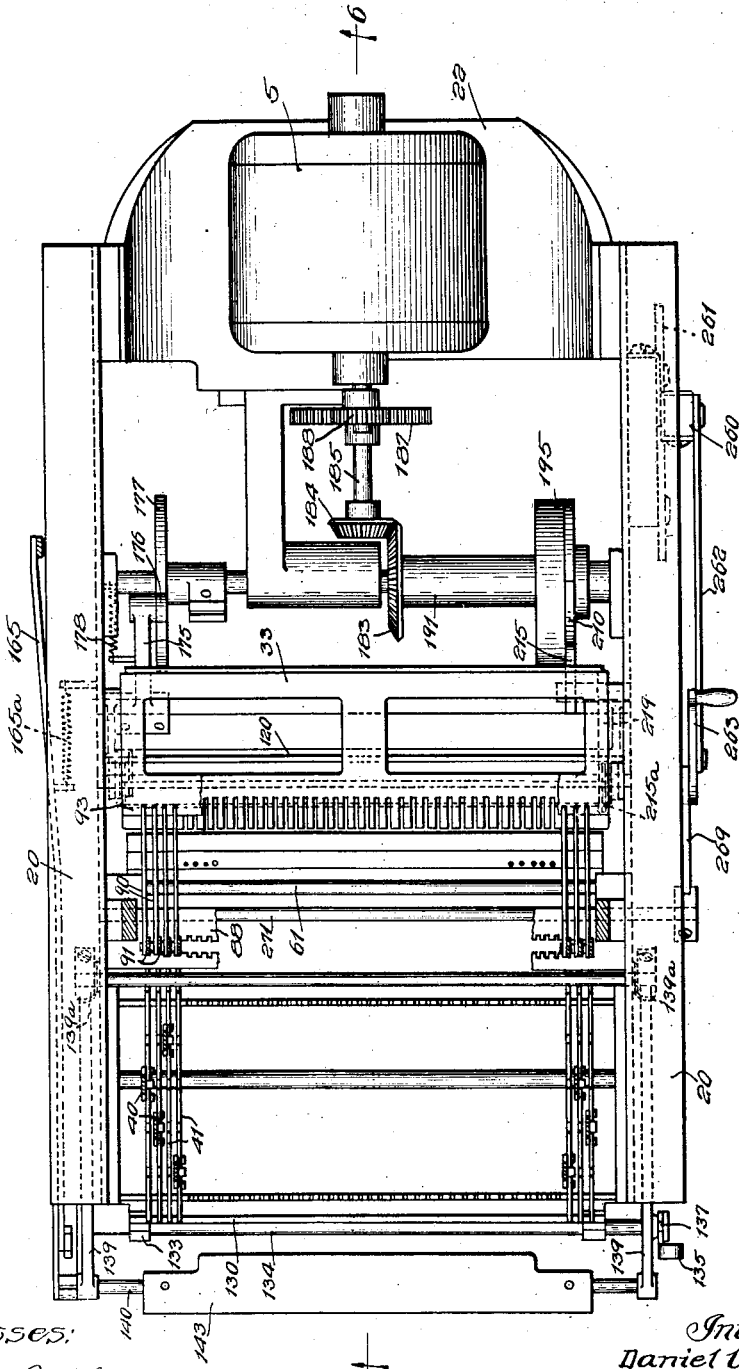

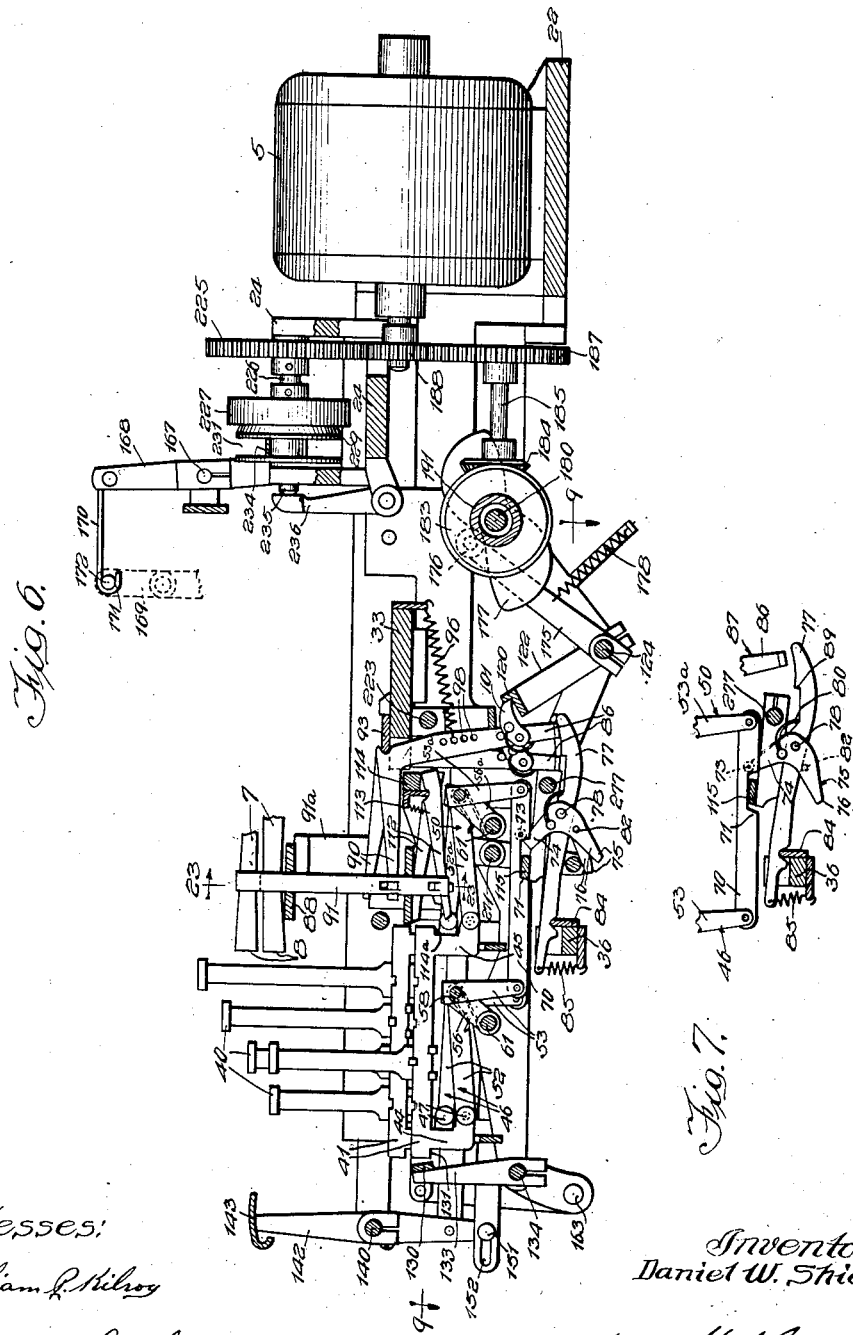

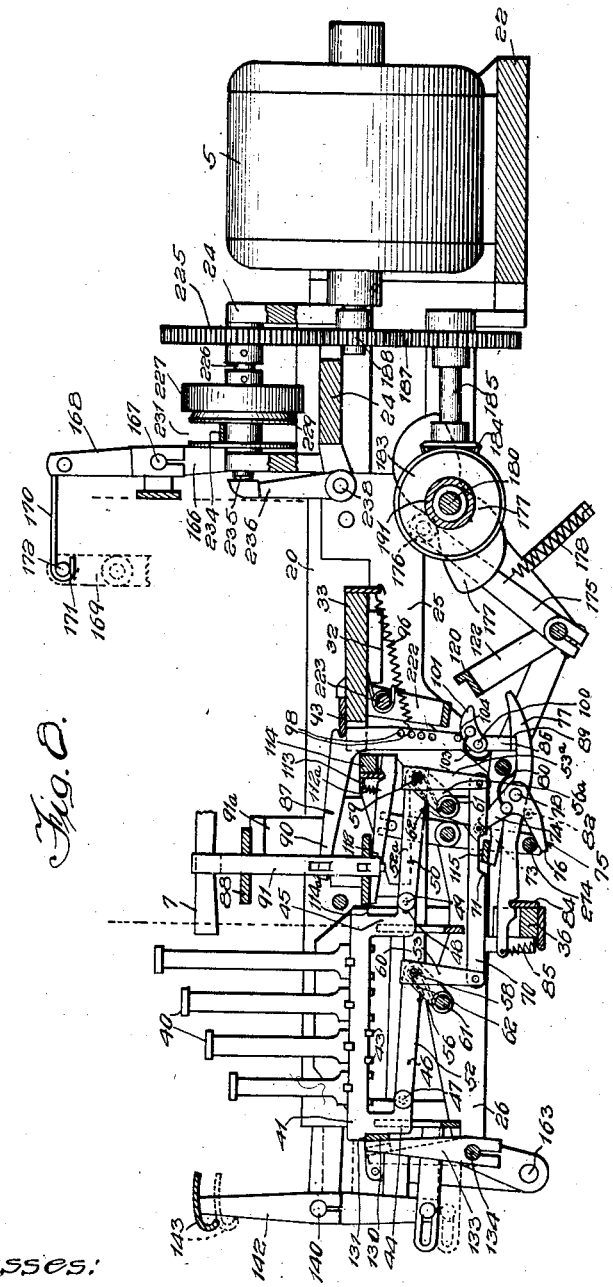

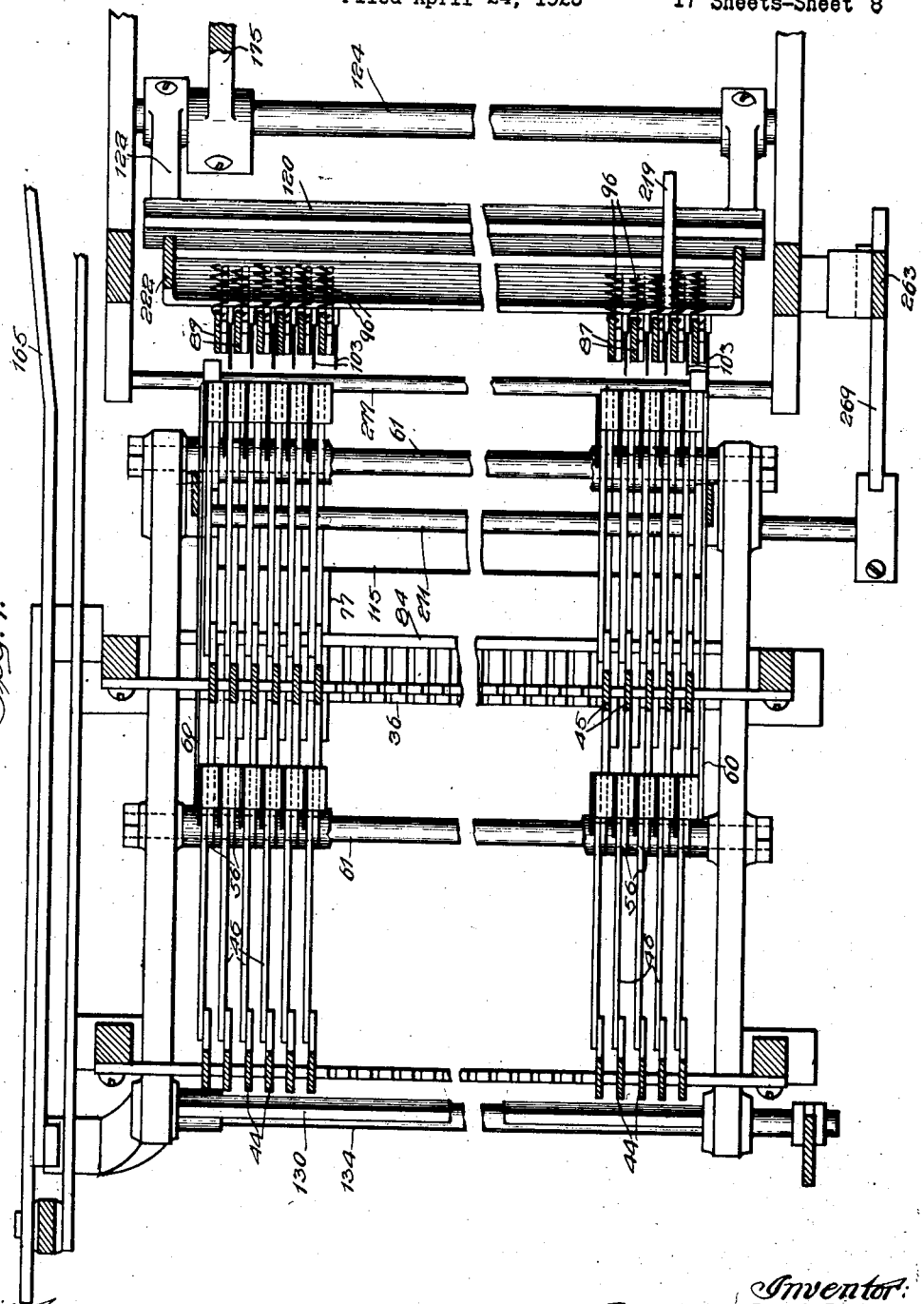

April 17, 1928.
D. W. SHIEK
1,666,267
WRITING MACHINE
Filed April 24, 1925
17 Sheets-Sheet 9
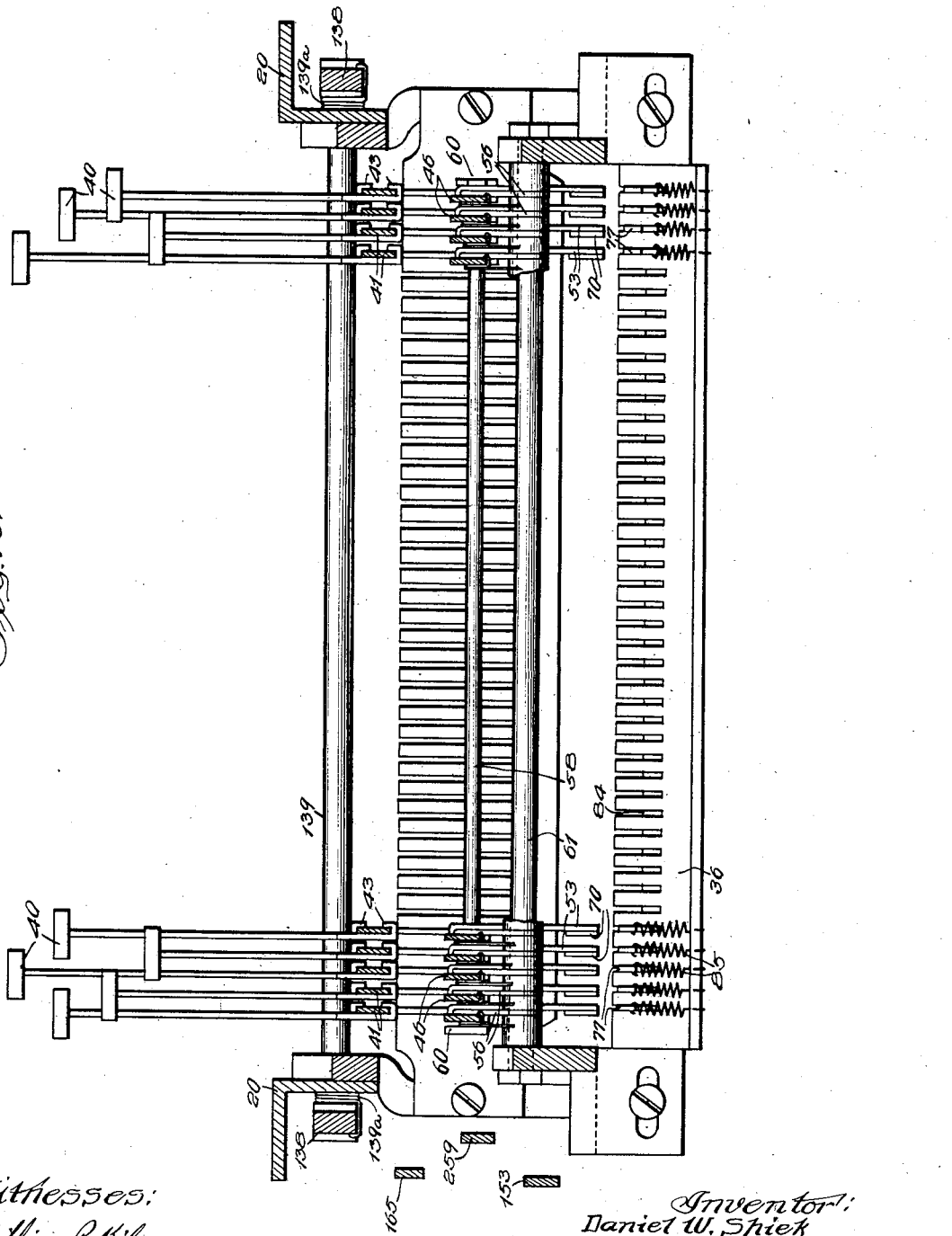

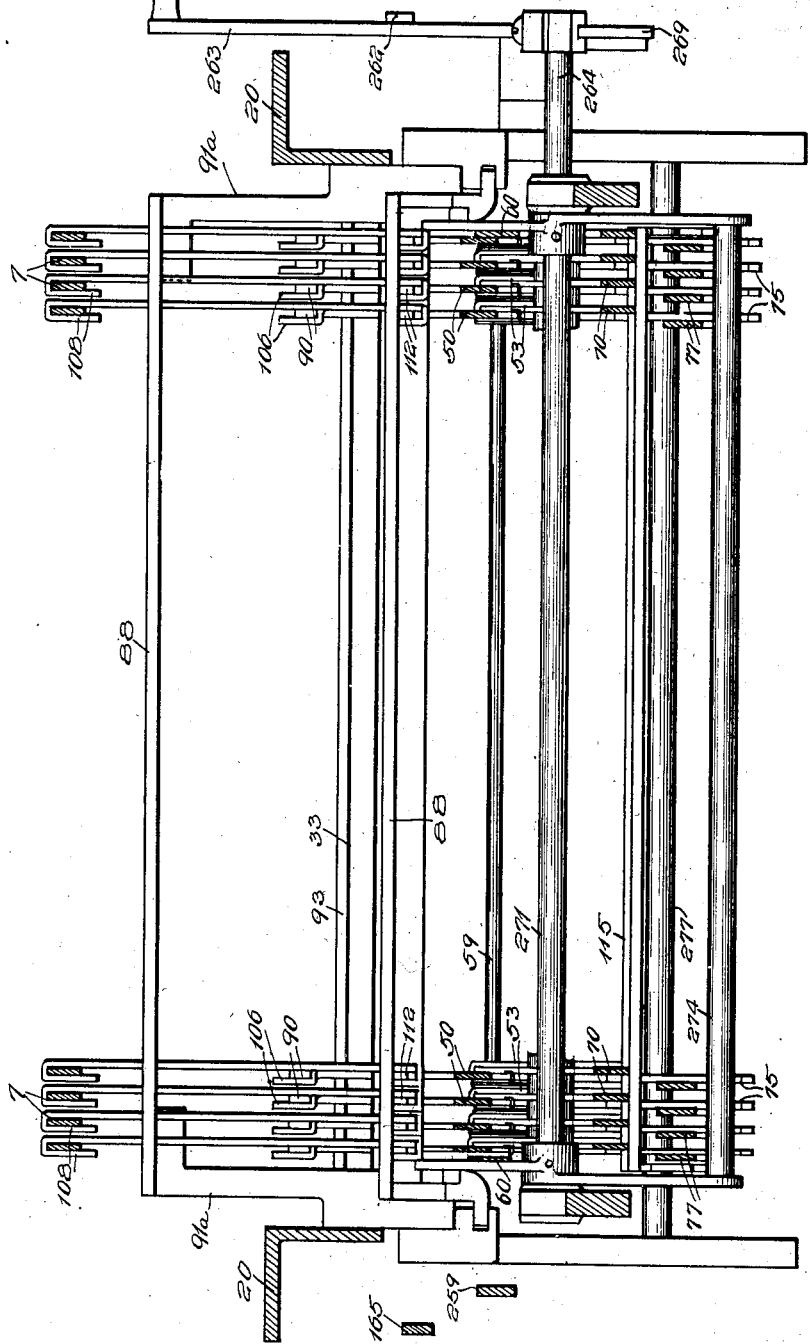

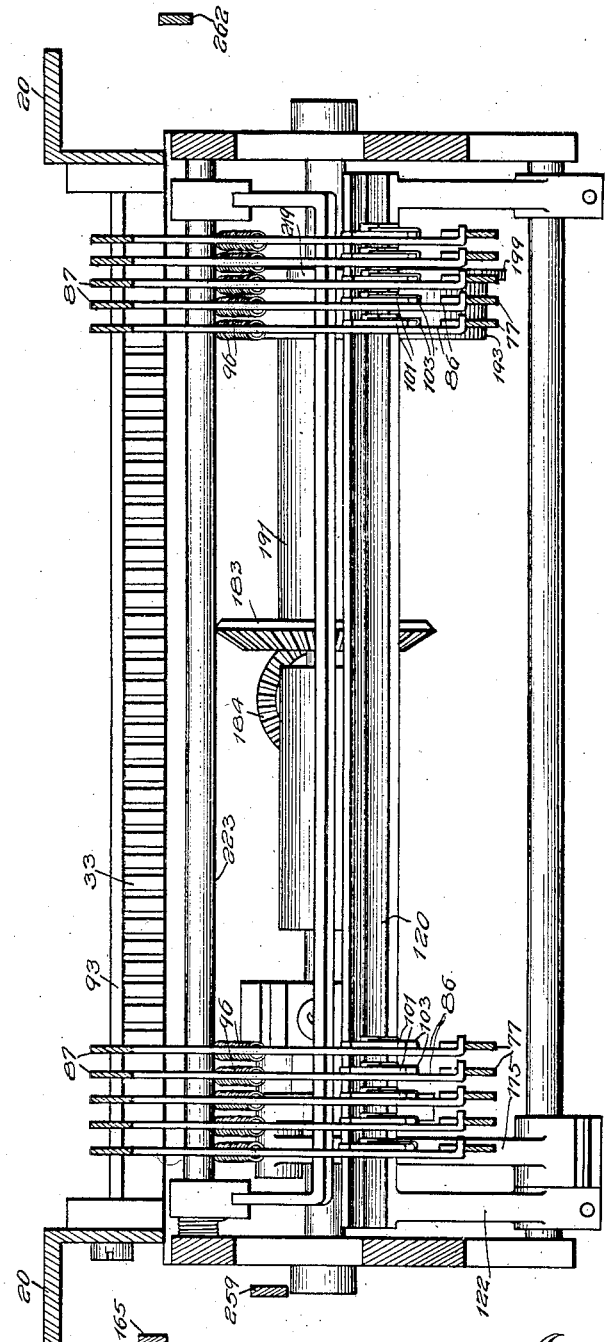

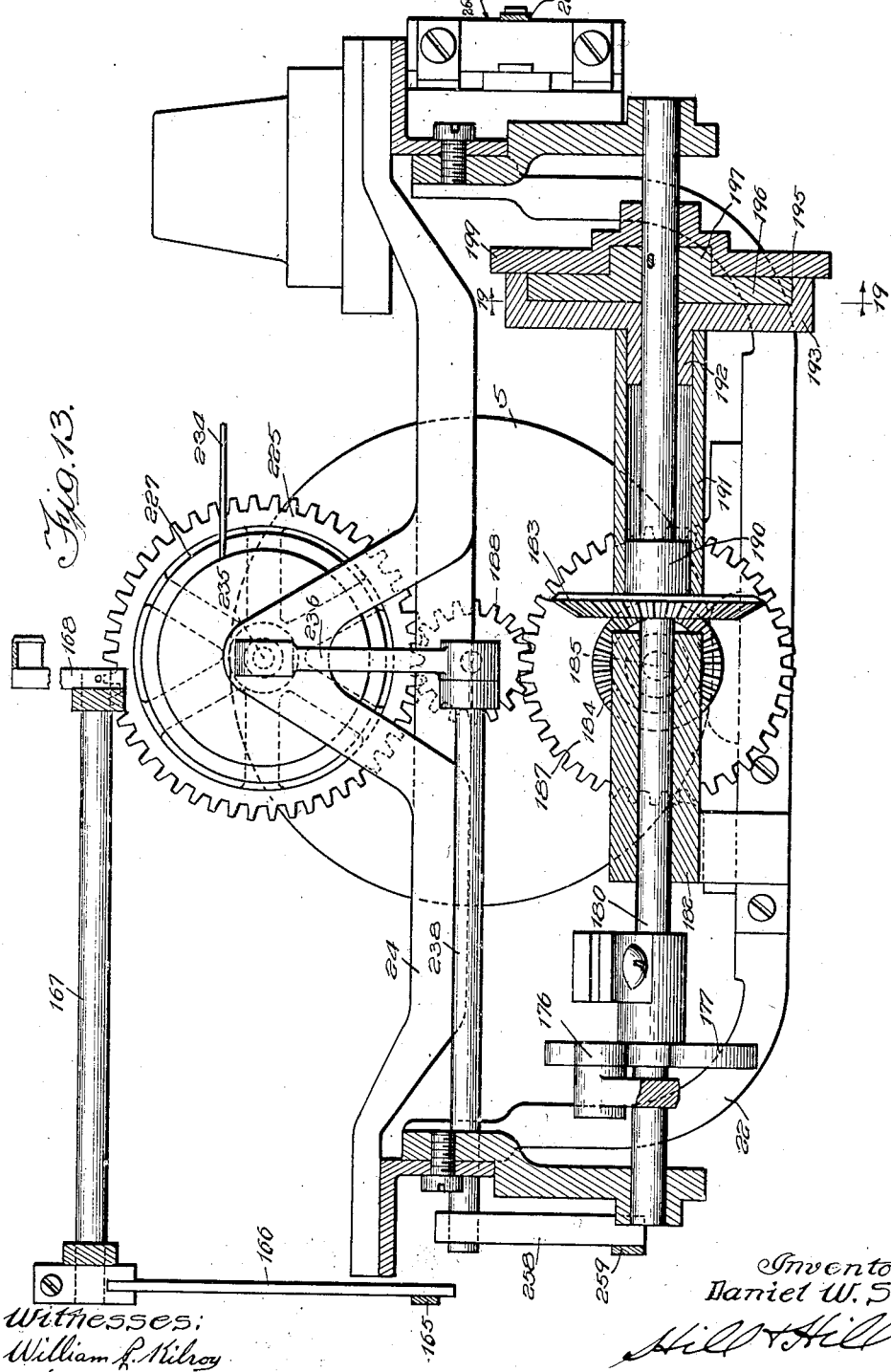

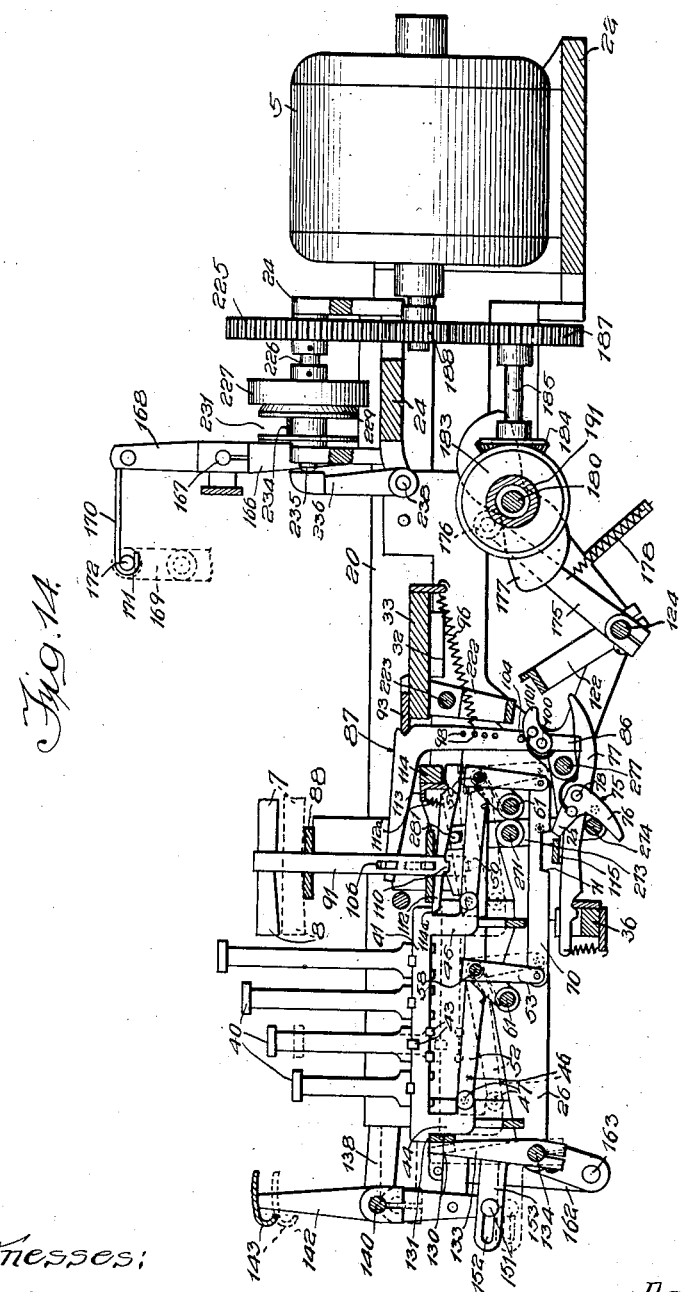

April 17, 1928.

D. W. SHIEK

WRITING MACHINE

Filed April 24, 1925

Witnesses:
William F. Kilroy
Harry L. White.

Inventor:
Daniel W. Shiek

By Hill & Hill
Attys

April 17, 1928. 1,666,267
D. W. SHIEK
WRITING MACHINE
Filed April 24, 1925 17 Sheets-Sheet 16

Witnesses:
William P. Kilroy
Harry R. Lechte

Inventor:
Daniel W. Shiek
By Hill & Hill
Attys

April 17, 1928.
D. W. SHIEK
1,666,267
WRITING MACHINE
Filed April 24, 1925 17 Sheets-Sheet 17
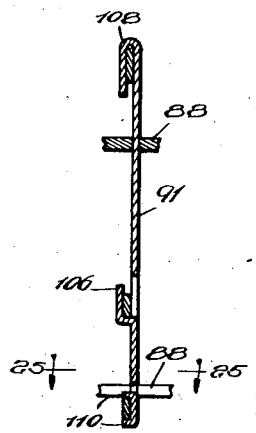
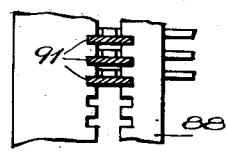
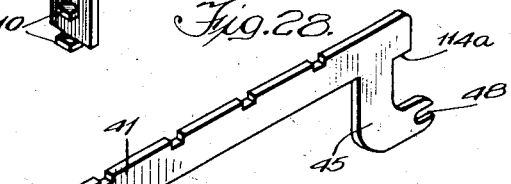
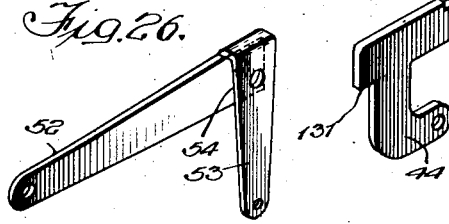
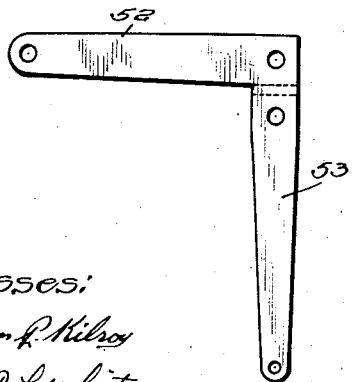
Inventor:
Daniel W. Shiek Patented Apr. 17, 1928.

1,666,267

UNITED STATES PATENT OFFICE.

DANIEL W. SHIEK, OF AURORA, ILLINOIS, ASSIGNOR TO S. E. MILLER, TRUSTEE, OF AURORA, ILLINOIS.

WRITING MACHINE.

Application filed April 24, 1925. Serial No. 25,524.

My invention belongs to that general class of devices known as writing machines, and relates more particularly to a key-controlled writing machine such as a typewriter or the like, preferably arranged to be operated manually or from a source of power. The term writing machine is herein employed to include all mechanisms for recording intelligence, such as printing machines, perforating machines, embossing machines or any other machine wherein means are employed to record data of any kind upon some articles as, for instance, a sheet of paper, a card, a plate or other suitable material. In the particular embodiment herein shown and described, the printing operation is independent of the power driving mechanism, but is key-controlled and spring actuated, the power driven mechanism being employed to automatically return the parts to normal positions after each writing or printing operation. The device is in the nature of a mechanism or apparatus particularly adapted to be applied in various types of typewriting machines or such other key machines to which it may be applicable. The invention has among its objects the production of a device of the kind described which is simple, convenient, compact, reliable, durable, efficient and satisfactory for all uses to which it may be applicable. It has as a further object the production of a device of the kind described by means of which the typewriter or the like may be operated manually without the application of power or in conjunction with the application of outside power such as an electric motor or a drive shaft driven from any other source of power. One of the objects of the invention is the production of a mechanism that will increase the speed of the machine and which will enable the operator to turn out more work with less tiring effort. Another object of the invention is to provide a power driven writing machine which will give uniform impressions of the type. Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 2 is a side elevation of the operating mechanism, with the typewriter omitted;

Fig. 3 is a similar view of the opposite side of the mechanism shown in Fig. 2;

Fig. 4 is an end elevation of the front or operating side of the mechanism shown in Fig. 2.

Fig. 5 is a sectional view taken substantially on line 5—5 of Fig. 2;

Fig. 6 is a sectional view taken substantially on line 6—6 of Fig. 5;

Fig. 7 is a view illustrating a portion of the mechanism shown in Fig. 6 in changed positions;

Fig. 8 is a sectional view similar to Fig. 6, with the parts unlocked and ready for operation as a power driven machine;

Fig. 9 is a sectional view taken substantially on line 9—9 of Fig. 6;

Fig. 10 is a sectional view taken substantially on line 10—10 of Fig. 2;

Fig. 11 is a sectional view taken substantially on line 11—11 of Fig. 2;

Fig. 12 is a sectional view taken substantially on line 12—12 of Fig. 2.

Fig. 13 is a sectional view taken substantially on line 13—13 of Fig. 2;

Fig. 14 is a view similar to Fig. 6, showing the parts set for hand operation;

Fig. 23 is a sectional view taken substantially on line 23—23 of Fig. 6 illustrating a link member forming part of the improved machine and means for slidably journaling the link member;

Fig. 24 is a perspective view of the link member shown in Fig. 23;

Fig. 25 is a sectional view taken substantially on line 25—25 of Fig. 23, showing several link members;

Fig. 26 is a perspective view of a bell crank lever forming part of the improved machine;

Fig. 27 is a view in elevation of the blank from which the bell crank lever shown in Fig. 26 is formed;

Fig. 28 is a perspective view of a bar forming part of the improved machine; and Fig. 29 is a perspective view of one of keys whereby the operation of the machine is manually controlled.

Figure 1:
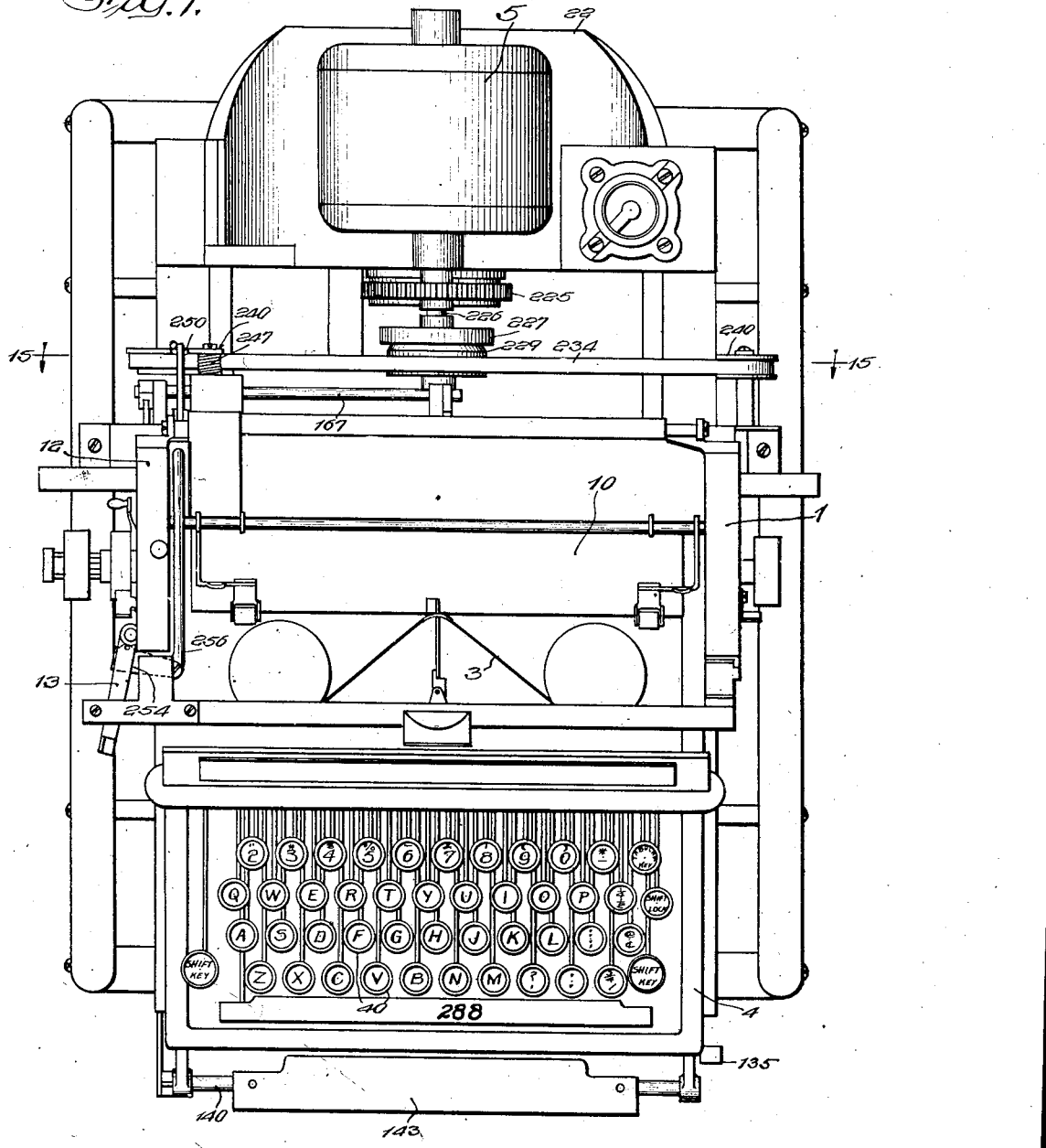
Fig. 1 is a plan view of the machine.

Referring to the drawings, in which the preferred embodiment of the invention is shown as applied to a standard well-known type of typewriter, 1 represents the typewriter frame, 3 the ribbon and 4 the front part of the frame within the confines of which are the keys. I have shown an electric motor 5 as the source of power, it being understood that any equivalent source of power may be employed.

Other than in Fig. 1, I have not illustrated the typewriter, except where portions are needed in the other figures in order to make clear the operation or application, the typewriter in itself being constructed in any of the well-known manners. I use the typewritter substantially in its original form, except that I sever the key rods adjacent the keys and connect my mechanism with the portions that are left on the typewriter.

Referring to Fig. 6, and the other figures, 7—7, etc., represent the usual bars connecting the keys with the type bars. These are cut off or severed or the machine originally so constructed so that the same terminates substantially as indicated at 8 in Fig. 6. It may be mentioned, however, that my invention and the typewriter may be built as a unit, but I have illustrated and described the same as applied to a standard typewriter in order to facilitate the understanding of my invention and to avoid the unnecessary describing in detail of the construction and operation of a typewriter. As before mentioned, my apparatus embodies the usual typewriter construction as an element, any key bar typewriter being satisfactory in most cases. Such typewriters usually comprise a cylindrical platen 10 rotatably mounted in a carriage 12, which is slidably mounted in the frame 1. Means comprising the usual pivoted lever 13, of the equivalent, is provided for shifting the carriage 12 to the right for each new line of writing, the construction being such that the platen 10 is rotated a predetermined distance during such movement to the right.

My improved apparatus for actuating the bars 7—7 is preferably mounted in an auxiliary frame comprising angle irons 20, which may be secured to the under side of the frame 1 in any suitable manner. As shown in Fig. 13, a U-shaped bracket 22 secured to the angle irons 20 is adapted to support the motor 5, a bracket 24 also secured to the angle irons 20, being provided to support certain clutch mechanism, which is hereinafter described.

The auxiliary frame also comprises a pair of brackets 25 and a pair of brackets 26, the brackets 25 being secured directly to the angle irons 20 and the bracket 26 being provided with outstanding lugs 28, whereby they are secured to a pair of brackets 30. (Figs. 2 and 8.) The brackets 30 are fixed to the angle irons 20. Secured to lugs 32, formed upon the inner surfaces of the brackets 25 is a bar 33 and secured to downwardly extending lugs 34 formed upon the brackets 26 is a bar 36. The purpose of this construction will presently appear.

I will first describe my improved apparatus as it is adjusted when it is operatively connected to the motor 5 so that the motor may automatically return the parts to normal positions after each writing operation.

Associated with each bar 7 is a key 40 projecting upwardly from and secured to a bar 41. As shown in Fig. 29, each key 40 is provided with lugs 43, whereby the key may be secured to a bar 41, the lugs 43 being bent around the bar 41 during the assembly of the apparatus. The bar 41 is provided with integral downwardly projecting extensions 44 and 45, the extension 44 being pivotally secured to a bell crank lever 46 by means of a rivet 47, and the extension 45 being provided with a slot 48 engageable by a pin 49 projecting from a bell crank lever 50, which is substantially identical in structure to the bell crank lever 46. (Figs. 8 and 28.) Each bell crank lever 46 comprises integral arms 52 and 53 formed from a sheet metal blank, as illustrated in Figs. 26 and 27, the blank being bent so that the arms 52 and 53 extend at right angles to each other and provide a slot 54 adapted to receive one end of a bar 56. The arms of the bell crank levers 50 are identified by the reference characters 52$^a$ and 53$^a$, the arms 52$^a$ and 53$^a$ being spaced apart to receive one end of a bar 56$^a$ which is similar to the bar 56. The bell crank levers 46 and 50 are pivoted upon rods 58 and 59 which pass through suitable apertures in the respective levers and in the respective bars 56 and 56$^a$. The ends of the rods 58 and 59 are fixed in end plates 60 mounted upon the rods 61 which are carried by and rigidly secured in the brackets 26. The bars 56 and 56$^a$ are provided with apertures through which the tie rods 61 pass. Coiled springs 62 carried by the rods 58 and 59 are adapted to hold the bell crank levers 46 and 50, the bar 41 and the key 40 in the positions wherein they are shown in Figs. 2 and 8. The free ends of the arms 53 and 53ᵃ are connected by a link 70 having a shoulder 71 formed intermediate its ends, the shoulder 71 being adapted to limit the movement of the links as hereinafter explained. The bar 41, the bell crank levers 46 and 50, and the link 70 constitute a parallel motion mechanism which constrains the key 40 to move in a substantially straight line when it is depressed. It is understood, of course, that each key 40 is associated with a link 70 operatively connected to it in the manner above described.

Projecting laterally from each link 70 is a pin 73 arranged to engage an arm 74 of a bell crank lever 75, which also comprises an arm 76, the bell crank lever 75 being pivotally secured to a lever 77 by means of a pin 78. A spring 80 interposed between the bell crank lever 75 and the lever 77 tends to hold the bell crank lever 76 in a position wherein a pin 82 projecting therefrom will engage the lever 77. The lever 77 is loosely pivoted upon a plate 84 secured to the aforementioned bar 36 and a spring 85 tends to hold it in a position wherein it will engage the downwardly extending end 86 of a bell crank lever 87, the lever 77 being provided with a notch 89 to so engage the arm 86. The bell crank lever 87 also comprises an arm 90, which engages a vertically disposed link 91. The link 91 is slidably mounted in plates 88 secured to brackets 91ᵃ mounted upon the angle irons 20. The bell crank lever 87 is loosely pivoted upon a plate 93 secured to the aforementioned bar 33, the bell crank lever being held in engagement with the plate by a spring 96, which also tends to rotate the bell crank lever in a counter-clockwise direction (Fig. 8). As shown, one end of the spring 96 is hooked into one of a plurality of apertures 98 formed in the bell crank lever 87, several apertures being provided so that the tension of the spring 96 may be adjusted to have the type associated with the bell crank lever strike the platen with the same force as the remaining type of the typewriter. This construction insures uniform impressions from the type.

Pivotally mounted upon the bell crank lever 87, by means of a pin 100, is a pawl 101. A spring 103 interposed between the bell crank lever and the pawl yieldingly holds the pawl in engagement with a pin 104 projecting from the bell crank lever.

As above described, the arm 90 of the bell crank lever 87 engages a vertically disposed link 91, the link 91 being provided with a lug 106 against which the arm 90 normally rests (Fig. 23). The upper end of the link 91 is provided with a hook 108 adapted to engage the associated bar 7. The lower end of the link 91 is provided with lugs 110, which slidably engage the free end of a lever 112, the lever 112 being loosely pivoted upon a plate 113 secured to a bar 114. A spring 112ᵃ tends to rotate the lever 112 in a clockwise direction (Fig. 8). When the apparatus is operatively connected to the motor 5, the lever 112 is positioned so that its free end cannot engage a shoulder 114ᵃ formed upon the associated bar 41. The purpose of this construction will presently appear.

It is obvious that if the key 40 is depressed, the bell crank levers 46 and 50 will be rotated in a counter-clockwise direction (Fig. 8) and the link 70 will be moved to the right (Fig. 8) until its shoulder 71 engages a bar 115 normally disposed in the path of the shoulder. This movement of the bar 70 will cause the pin 73 to engage the arm 74 of the bell crank lever 75 in such manner that the bell crank lever 75 and the lever 77 will be moved as a unit to a position wherein the notch 89 will be withdrawn from engagement with the arm 86 of the bell crank lever 87. The spring 96 will then rotate the bell crank lever 87 in a counter-clockwise direction (Fig. 8), which action will cause the link 91 to depress the bar 7. This movement of the bar 7 will cause the associated type to print. The key 40, the bar 41, the bell crank levers 46 and 50, and the bar 70 will be restored to their normal positions by the springs 62. The lever 77 will be yieldingly held by the spring 85 in a position wherein it may engage the arm 86 of the bell crank lever 87 when the bell crank lever is restored to its normal position.

The means for restoring the bell crank lever 87 to its normal position against the action of the spring 96 comprises a transverse bar 120 secured to the free ends of a pair of levers 122 which are mounted upon and fixed to a rock shaft 124 pivoted in the aforementioned brackets 25. The arrangement is such that if the rock shaft 124 is rotated in a counter-clockwise direction (Fig. 8) the bar 120 will engage the pawl 101 and displace it and the bell crank lever 87 into positions wherein the arm 86 of the bell crank lever may be engaged by the notch 89 formed in the lever 77. The engagement of the arm 86 by the notch 89 will, of course, lock the bell crank lever 87 in its normal position with the spring 96 under tension. The pawl 101 pivots on the pin 100 during the restoring operation so that the bar 120 need only overcome the action of the associated spring 96 and not that of all of the springs 96. The means for rocking the shaft 124 is described hereinafter.

When the apparatus is operatively connected to the motor 5, the bars 41 are normally held against downward movement by a bar 130 extending transversely of the bars 41 and adapted to engage shoulders 131 formed upon the bars 41. The bar 130 is fixed to the free ends of a pair of levers 133 which are clamped to a rock shaft 134 mounted in the brackets 26. As shown in Fig. 2, a lever 135 clamped to a rock shaft 134 is provided with a cam surface 136 engageable by a pin 137 which projects from one of a pair of links 138, the links 138 being fixed upon a rock shaft 139, which is pivotally mounted in the angle irons 20 and is urged in a clockwise direction (Fig. 2) by springs 139ª. The lever 135 is urged in a clockwise direction (Fig. 2) by a spring 135ª. Pivotally mounted in the links 138 is a shaft 140 to which is clamped an upwardly extending arm 142. Rigidly secured to the upper end of the arm 142 is a curved plate 143 upon which the wrists of the operator may rest during the operation of the apparatus, the weight of the operator's wrists being sufficient to depress the shaft 140 against the action of the springs 139ª into a position wherein the pin 137 will rest upon a shoulder 145 formed upon the lever 135. Such movement of the pin 137 will cause it to ride over the cam surface 136, whereupon the lever 135 will rotate the shaft 134 into a position wherein the bar 30 will be disposed in the position wherein it is shown in dotted lines in Fig. 8. The operator may then depress the keys 40.

Secured to the shaft 140 is a downwardly extending lever 150 carrying a pin 151, which engages a slot 152 formed in a link 153, the link 153 being pivotally mounted on a pin 155 projecting from one of the brackets 30. Referring to Fig. 3, a pawl 158 is pivotally mounted intermediate its ends upon the link 153 and is so designed that one of its ends normally rests against a pin 159 projecting from the link. When the plate 143 is depressed, the link 153 will be displaced through substantially the same angle as the links 138 and the pawl 158 will be brought into a position wherein it lies underneath an anti-friction roller 160 mounted upon a lever 162, which is pivoted upon a pin 163 projecting from one of the brackets 26. The pawl 158 will move from its upper to its lower position without displacing the anti-friction roller 160. When the plate 143 is permitted to return to its normal position, the pawl 158 will displace the anti-friction roller 160 and rotate the lever 162 in a clockwise direction (Fig. 3). The lever 162 is connected by a link 165 to a lever 166 secured to a rock shaft 167 to which is also secured an upwardly extending lever 168. A spring 165ª preferably urges the link 165 to the left (Fig. 3). The lever 168 is connected to a pivoted lever 169 by a link member 170 having a slot 171, which engages a pin 172 projecting from the lever 169. The lever 169 is usually provided as a part of the spacing mechanism of the typewriter. The operator may space or shift the carriage between the words by permitting the plate 143 to return to its normal position, this movement of the plate 143 being accompanied by angular displacement of the lever 162, which, in turn, angularly displaces the lever 169 through the above described mechanism connecting the lever 162 with the lever 169.

Figure 19:
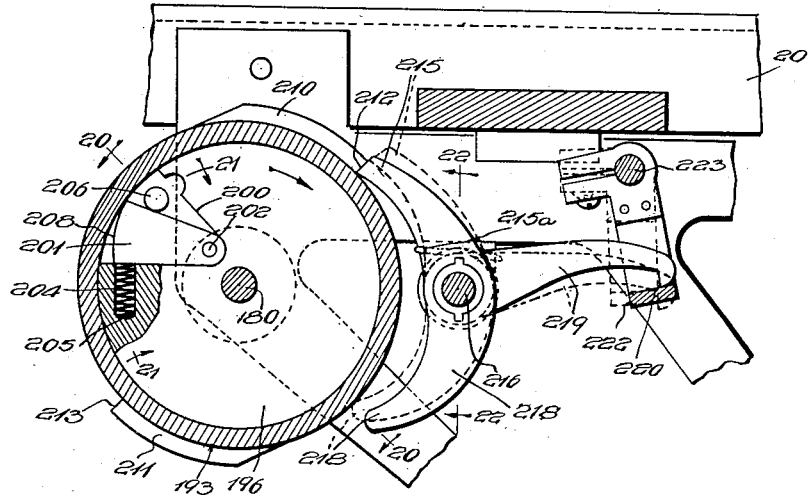
Fig. 19 is a sectional view taken substantially on line 19—19 of Fig. 13.
Figures 20, 21:
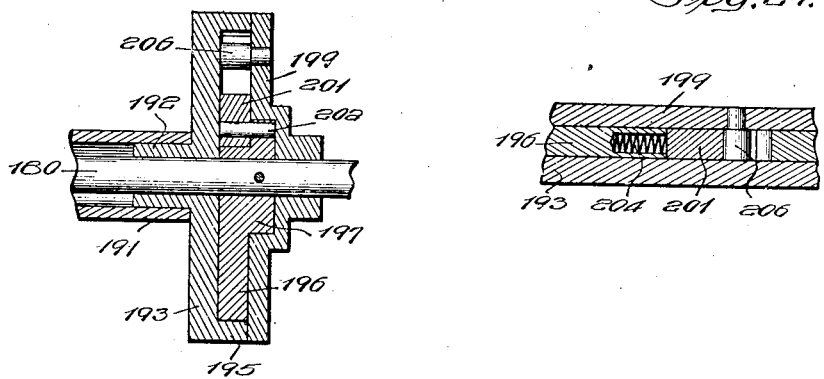
Fig. 20 is a sectional view taken substantially on line 20—20 of Fig. 19.
Fig. 21 is a sectional view taken substantially on line 21—21 of Fig. 19.
Figure 22:
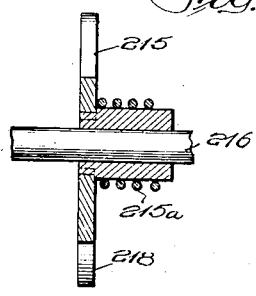
Fig. 22 is a sectional view taken substantially on line 22—22 of Fig. 19.

Referring now to the above-mentioned means for rocking the shaft 124 to restore the bell crank levers 87 to their normal positions, said means may comprise a lever 175 secured to the rock shaft 124 and provided at its free end with an anti-friction roller 176. The anti-friction roller 176 is held in engagement with a cam 177 by a spring 178, the cam 177 being clamped to a shaft 180 (Fig. 13). The shaft 180 is rotatably journaled in the brackets 25 and a bearing bracket 182 mounted on the U-shaped bracket 22. Rotatably mounted on the shaft 180 is a bevel gear 183, which meshes with a bevel gear 184 secured to a shaft 185. Also secured to the shaft 185 is a spur gear 187 meshing with a pinion 188 secured to a shaft of the motor 5. The shaft 185 is journaled in the bearing bracket 182. The gear 183 has a hub 190 secured in one end of a drum 191 in the other end of which is secured a hub 192 of an over-running clutch member 193, the over-running clutch member 193 being rotatably journaled upon the shaft 180. Formed integral with the over-running clutch member 193 is an annular flange 195 adapted to accommodate a disk 196 having a hub 197 which is pinned to the shaft 180. The disk 196 is interposed between the over-running clutch member 193 and a cam plate 199 rotatably journaled upon the shaft 180. As shown in Figs. 19 and 20, the disk 196 is notched as at 200 to receive a dog 201, which is pivotally mounted upon a pin 202 projecting from the hub 197. A compression spring 204 disposed in a recess 205, which is formed in the disk 196, urges the dog 201 against a pin 206 projecting from the cam plate 199. The dog 201 is provided with an arcuate surface 208, which may be brought into driving engagement with the inner surface of the annular flange 195. The cam plate 199 is provided with diametrically disposed cam lugs 210 and 211, the cam lugs 210 and 211 forming shoulders 212 and 213, respectively, engageable by a pawl 215 mounted on a stud shaft 216. Formed integral with the pawl 215 is an extension 218 engageable by the cam lugs 210 and 211. Also formed integral with the pawl 215 is a latch 219 having a shoulder 220 adapted to hook over a U-shaped member 222 clamped upon a rock shaft 223. The pawl 215, the extension 218 and the latch 219 are urged in a clockwise direction (Fig. 19) by a spring 215ª. The rock shaft 223 is rotatably journaled in the brackets 25. The U-shaped member 222 is normally held by a spring 222ª in the position wherein it is shown in full lines in Figs. 8 and 19 so that it may be engaged and angularly displaced by the bell crank levers 87 when the keys 40 are depressed. Such displacement of the U-shaped member 222 will bring it into a position wherein it is shown in dotted lines in Fig. 19, and permit the shoulder 220 to engage it and hold it against movement to its normal position.

When the motor 5 is in operation, the over-running clutch member 193 is continuously driven in a clockwise direction (Fig. 19). Because of the frictional engagement between the disk 196, the cam plate 199 and the over-running clutch member 193, the disk and cam member tend to rotate in the same direction. Such rotation of the cam plate 199 is normally prevented by the pawl 215, which engages one of the shoulders 212 and 213, the pawl 215 being held in engagement with the shoulder by the latch 219 which rests against the U-shaped member 220. The disk 196 is prevented from rotating with the member 193 by the pin 206 which lies in the path of the dog 201 and causes it to compress the spring 204. It is obvious that if one of the keys 40 is depressed and its associated bell crank lever 87 angularly displaces the U-shaped member 222 to the position wherein it is shown in dotted lines in Fig. 19, the latch 219, the pawl 215 and the extension 218 will move into the positions wherein they are shown in dotted lines in the same figure, and permit the spring 204 to bring the arcuate surface 208 of the dog 201 into contact with the inner surface of the annular flange 195. The frictional engagement between the arcuate surface 208 and the inner surface of the flange 195 will cause the plate 199 and the disk 196 to rotate with the member 193 through an angle of 180 degrees, whereupon one of the shoulders 212 and 213 will be engaged by the pawl 215, to prevent further rotation of the disk and the cam plate. To bring the pawl 215 into the path of the shoulders 212 and 213, the extension 218 is so designed that when it is moved into the position shown in dotted lines in Fig. 19, it will be engaged by the cam lug 210 or 211 recently disengaged from the pawl 215. Such engagement of the extension 218 by one of the cam lugs will restore the pawl 215 to the position wherein it is shown in full lines in Fig. 19 and cause it to engage one of the cam lugs after the disk 196 and the cam plate 199 have passed through an angle of 180 degrees. It is, of course, understood that rotation of the disk 196 is accompanied by rotation of the shaft 180, which, in turn, rotates the cam 177. As shown in Fig. 8, the cam 177 is so designed that each time it is rotated through an angle of 180 degrees, it will cause the lever 175 to oscillate the rock shaft 124. As the shaft 124 is so oscillated, each time the U-shaped member 222 is angularly displaced by one of the bell crank levers 87, it is readily understood that the aforementioned bar 120 will restore the bell crank lever to its normal position by engaging its pawl 101 in the manner above described.

Figure 15:
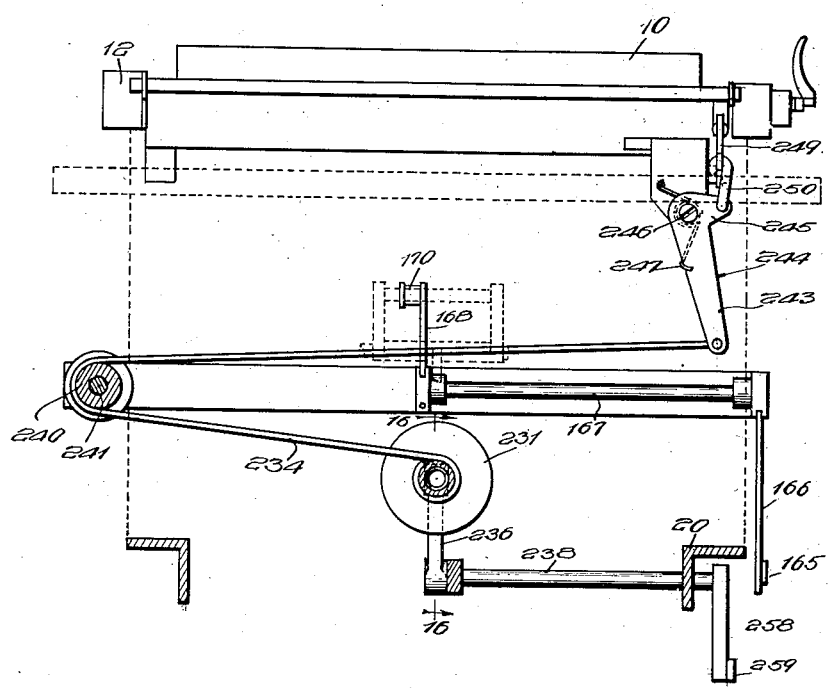
Fig. 15 is substantially a sectional view on line 15—15 of Fig. 1, and illustrates the carriage-moving mechanism, other parts of the machine being omitted.
Figure 16:
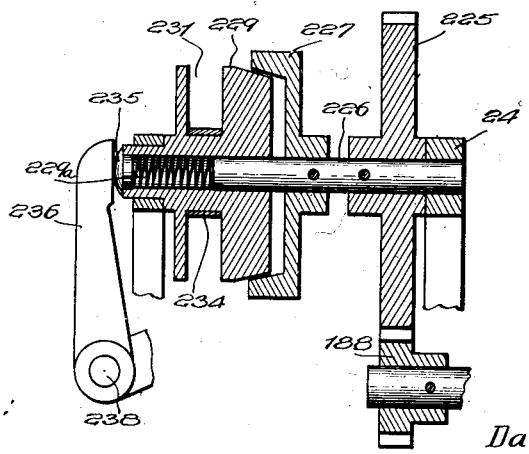
Fig. 16 is a sectional view taken substantially on line 16—16 of Fig. 15.
Figure 18:
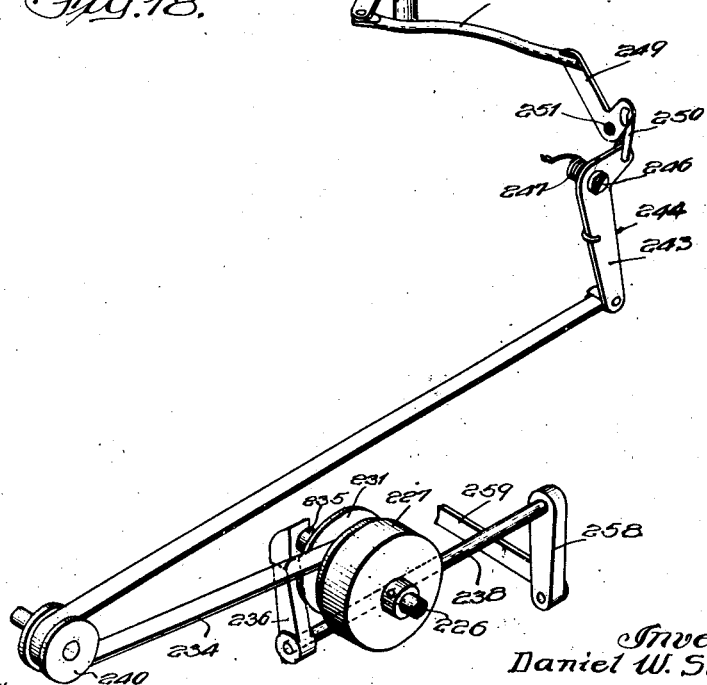
Fig. 18 is a perspective view illustrating the mechanism shown in Fig. 15.

Referring now to Figs. 6 and 13, the pinion 188 meshes with a gear 225 pinned to a shaft 226, which is rotatably journaled in the bracket 24. A clutch member 227 also pinned to the shaft 226 is adapted to be frictionally engaged by a clutch member 229 slidably and rotatably journaled upon the shaft 226. An annular groove 231 turned in the clutch member 229 is adapted to receive a flexible belt 234, one end of the belt being secured to the clutch member 229. Fixed in the bore of the clutch member 229 is a hardened steel button 235 between which and the shaft 226 is a spring 229ª urging the clutch member 229 away from the clutch member 227. The button 235 is engageable by a lever 236 secured to a rock shaft 238 which may be angularly displaced to bring the clutch member 229 into driving engagement with the clutch member 227. As shown in Figs. 15 and 18, the belt 234 is trained over a sheave 240 rotatably journaled upon a pin 241 projecting from the frame 1. The other end of the belt 234 is secured to the free end of an arm 243 of a bell crank lever 244, which also comprises an arm 245. The bell crank lever 244 is pivotally mounted upon the carriage 12 by means of a screw 246. A spring 247 interposed between the carriage 12 and the bell crank lever 244 tends to rotate the bell crank lever in a counter-clockwise direction (Fig. 15). The free end of the arm 245 is connected to a bell crank lever 249 by a link 250. The bell crank lever 249 is pivotally mounted upon the carriage 12 by a screw 251, the bell crank lever 249 being arranged to oscillate in a plane normal to the plane in which the bell crank lever 244 is adapted to oscillate. A latch member 254 having one end adapted to hook over the aforementioned lever 13 is operatively connected to the bell crank lever 249 by a link 256. The arrangement is such that when the clutch member 229 is brought into driving engagement with the clutch member 227, the clutch member 229 will be rotated to wind the belt 234 in the groove 231. This will be accompanied by angular displacement of the bell crank lever 244 around its pivotal axis against the action of the spring 247. Such displacement of the bell crank lever 244 will cause a corresponding angular displacement of the lever 13 to rotate the platen 10 so as to bring a sheet of paper carried by the carriage into a position for a new line of writing. As the belt 234 continues to wind up upon the clutch member 229, the carriage 12 will be shifted to the right until it strikes the usual stop provided upon the typewriter. As best shown in Fig. 3, the rock shaft 238 is operatively connected to the curved plate 143 by means comprising a lever 258, which is secured to one end of the shaft 238 and is connected by a link 259 to the lever 150. This construction permits the operator to control the operation of the clutch members 227 and 229 as the clutch member 229 may be brought into driving engagement with the clutch member 227 by angularly displacing the plate 143 in a counter-clockwise direction (Fig. 3) around the longitudinal axis of the shaft 140, such displacement of the plate 143 being accompanied by a like displacement of the rock shaft 238, which then causes the lever 236 to urge the clutch member 229 into engagement with the clutch member 227 against the action of the spring 229ᵃ.

In the operation of the above described mechanism, the motor 5 is first connected to any suitable source (not shown) of electrical energy by means comprising a switch 260 mounted upon the auxiliary frame; then after a sheet of paper has been properly inserted in the carriage 12, the operator's wrists are placed upon the plate 143 to bring the bar 130 out of engagement with the shoulders 131 on the bars 41. The keys 40 are then depressed in any desired order. When a key 40 is depressed the pin 73 on its associated bar 70 causes the corresponding lever 77 to withdraw from engagement with the proper bell crank lever 87, whereupon the bell crank lever is rotated by its spring 96 to actuate the proper bar 7. The key 40 and the bar 70 are restored to their normal positions by the springs 62, the lever 77 being yieldingly urged toward its normal position by the spring 85. The U-shaped member 222, which has been angularly displaced by the actuated bell crank lever 87 in the manner above described, has permitted the pawl 215 to become disengaged from one of the shoulders 212 and 213 formed upon the cam plate 199. This results in rotation of the cam 177 through an angle of 180 degrees, and the rock shaft 124 is oscillated in the manner above described to restore the bell crank lever 87 to its normal position, the pawl 101 carried by the bell crank lever being engaged by the bar 120, as hereinbefore set forth. This cycle of operation is repeated each time a key 40 is depressed. To space the carriage between words, the operator's wrists are removed from the plate 143 to allow the pawl 158 to angularly displace the anti-friction roller 160 and the lever 162 around the longitudinal axis of the shaft 163. The lever 162 is operatively connected to the lever 169, as above described, and the angular displacement of the lever 162 is accompanied by a corresponding displacement of the lever 169. The lever 169 forms part of the usual spacing mechanism provided in the typewriter and when angularly displaced causes the carriage 12 to shift a predetermined distance. When it is desired to position the paper in the carriage 12 for a new line of writing, the operator angularly displaces the plate 143 in a counter-clockwise direction (Fig. 3) around the longitudinal axis of the shaft 140, the angular displacement of the plate 143 effecting a driving engagement between the clutch member 227 and 229, as above described. The plate 143 is held in the position to which it is displaced until the carriage 12 strikes the usual stop provided in the typewriter.

I will now described the means for actuating the bars 7 when the motor 5 is not available, or when the operator does not desire to use the motor.

The aforementioned electrical switch 260 comprises a slide 261 connected by a link 262 to a bell crank lever 263 which is pivotally mounted upon a stud shaft 264 projecting from one of the brackets 25 (Fig. 2). A pin 266 projecting from the bell crank lever 263 rides in a cam slot 268 formed in a lever 269 which is clamped upon one end of a rock shaft 271 rotatably journaled in the brackets 26. Secured to the rock shaft 271 are levers 273 which carry a rod 274. When the apparatus is to be manually operated without the aid of the motor 5, the lever 263 is angularly displaced in a counter-clockwise direction (Fig. 2) to cause the rod 274 to depress the arms 76 of the bell crank levers 75, the rod 274 being brought into a position wherein it engages the under surface of the levers 77 and locks them against movement relative to the bell crank levers 87. This position of the rod 274 is illustrated in Fig. 14, wherein the mechanism is shown as it is adjusted when it is to operated without the aid of the motor 5.

Figure 17:
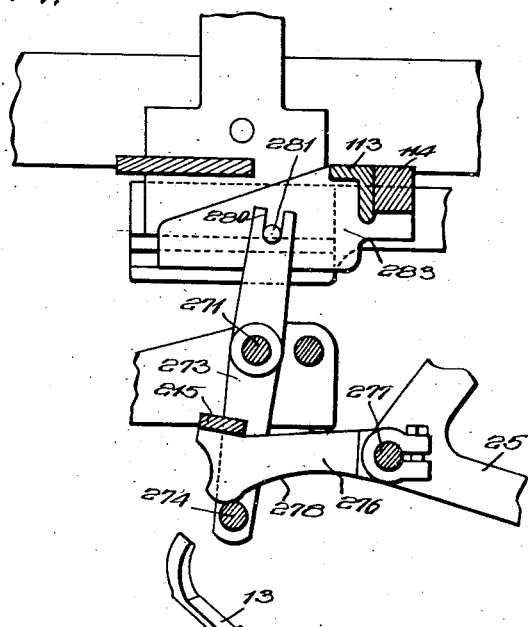
Fig. 17 is an enlarged sectional view showing a portion of the mechanism shown in Fig. 14 to more clearly illustrate the operation.

The aforementioned bar 115 adapted to engage the shoulders 71 is rigidly secured to the free ends of a plurality of levers 276 clamped to a shaft 277 pivotally mounted in the brackets 25. The levers 276 are provided with cam surfaces 278 engageable with the rod 274. When the motor 5 is in operation, the rod 274 holds the levers 276 in positions wherein the bar 115 is disposed in the path of the shoulders 71 (Fig. 17). When the bell crank lever 263 is angularly displaced to bring the rod 274 into a position wherein it holds the arms 76 in depressed positions, the levers 276 will fall into positions wherein the bar 115 cannot be engaged by the shoulders 71 (Fig. 14). Slots 280 formed in the upper ends of the levers 273 are adapted to receive pins 281 projecting from slides 283 mounted upon the brackets 25. The slides 283 carry the aforementioned bar 114. It will be readily understood that when the rod 274 is shifted to depress the arms 75, the slides 283 will be brought into positions wherein the aforementioned levers 112 will have their free ends disposed beneath the aforementioned shoulders 114ª formed upon the bars 41.

After the bell crank lever 263 has been angularly displaced in a counter-clockwise direction (Fig. 2) the plate 143 is depressed until the pin 137 can be positioned underneath a shoulder 286 formed upon the lever 135, it being necessary for the operator to angularly displace the lever 135 against the action of the spring 135ª to permit the pin 137 to pass the shoulder 145. When the plate 143 is in the position wherein the pin 137 engages the shoulder 286, the bar 130 will be held out of the path of the shoulders 131 formed upon the bars 41, these adjusted positions of the plate 143 and the bar 130 being indicated by dotted lines in Fig. 14.

When the apparatus is adjusted to be operated without the aid of the motor 5, the keys 40 may be depressed in any desired order. When any one of the keys 40 is depressed, the shoulder 114ª of its associated bar 41 engages the free end of the corresponding lever 112 and rotates the lever in a counter-clockwise direction (Fig. 14) against the action of its spring 112ª. This displacement of the lever 112 is accompanied by displacement of the associated link 91 to actuate the corresponding bar 7. It will be noted that the bell crank levers 87 are not affected by the displacement of the links 91 during the manual operation of the apparatus. The springs 62 restore the keys 40 to their normal position, the links 91 being restored to their normal position by the springs 112ª. The usual spacing bar 288 provided upon the typewriter may be depressed to space the words and the operator may use the lever 13 in the usual manner for each new line of writing.

While I have described my invention in connection with a typewriter, I am limited to this use only in so far as defined in the appended claims, it being obvious that the invention may be embodied with advantage in calculating machines having printing mechanisms, cash registers, machines for perforating data upon cards or the like, machines for producing music rolls, and in any other machine comprising means for printing upon, embossing, perforating or otherwise marking information upon an article.

A feature of my invention is improved means for the storing of energy in a plurality of means each of which is adapted to actuate impression making means. A convenient feature is the provision of an improved writing machine which may be quickly adjusted to operate as a power driven machine or to be operated independently of the source of power. Another convenient feature is the provision of a writing machine having printing mechanism, or the equivalent, means for actuating the printing mechanism, keys for controlling the last-mentioned means, and auxiliary means controlled by the keys for actuating the printing mechanism. Many other features are elsewhere described in the specification and defined in the appended claims.

Having thus described my invention, it is obvious that various immaterial modifications may be made in the same without departing from the spirit of my invention, hence I do not wish to be understood as limiting myself to the exact form, construction, arrangement and combination of parts herein shown and described or uses mentioned.

What I claim as new and desire to secure by Letters Patent is:

1. In apparatus of the kind described, a plurality of impression members, keys, spring-actuated mechanism controlled by said keys for actuating the impression members, power driven means for tensioning the springs of the spring-actuated mechanism, means independent of said spring-actuated mechanism and controlled by the keys for actuating said impression members, and means for rendering said spring-actuated means functionally inoperative.

2. In apparatus of the kind described, a plurality of impression members, keys, spring-actuated mechanism controlled by the keys for actuating the impression members, means including an electrical motor for tensioning the springs of the spring-actuated mechanism, means independent of said spring-actuated mechanism and controlled by the keys for actuating said impression members, means for rendering said spring-actuated means ineffective, means for connecting said electrical motor to a source of electrical energy, and common means for controlling said connecting means and said means adapted to render the spring-actuated mechanism ineffective.

3. In apparatus of the kind described, a plurality of impression members, keys, spring-actuated mechanism controlled by the keys for actuating the impression members, means including an electrical motor for tensioning the springs of the spring-actuated mechanism, means independent of said spring-actuated mechanism and controlled by the keys for actuating said impression members, means for rendering said spring-actuated means ineffective, means for connecting said electrical motor to a source of electrical energy, and a lever for controlling said connecting means and said means adapted to render said spring-actuated mechanism ineffective.

4. In an apparatus of the kind described, a movable paper carriage, a platen mounted thereon, impression members, keys, power driven means controlled by the keys for operating the impression members, a movable hand-rest adjacent the keys, and means controlled by the movable hand-rest for returning the paper carriage to a position wherein a new line of writing may be commenced upon the paper.

5. In an apparatus of the kind described, a movable paper carriage, a platen mounted thereon, impression members, keys, power driven means controlled by the keys for operating the impression members, a movable hand-rest adjacent the keys, and means including a clutch controlled by the movable hand-rest for returning the paper carriage to a position wherein a new line of writing may be commenced upon the paper.

6. In apparatus of the kind described, a movable paper carriage, a platen mounted thereon, impression members, keys, power driven means controlled by the keys for operating the impression members, a movable hand-rest adjacent the keys, means controlled by the hand-rest for shifting the carriage to space between words of writing impressed upon the paper, and means controlled by the hand-rest for returning the carriage to a position wherein a new line of writing may be commenced.

7. In apparatus of the kind described, a movable paper carriage, a platen mounted thereon, impression members, keys, power driven means controlled by the keys for operating the impression members, a pivotally mounted hand-rest adjacent the keys, means controlled by the hand-rest for shifting the carriage to space between words of writing impressed upon the paper, and means controlled by the hand-rest for returning the carriage to a position wherein a new line of writing may be commenced.

8. In apparatus of the kind described, a plurality of type bars, a plurality of key bars for operating said type bars, a plurality of keys, spring-actuated means controlled by the keys for actuating the key bars, power driven means for tensioning the springs of said spring-actuated means, a plurality of means movable into positions wherein they are operable by said keys for actuating the key bars, mechanism for rendering the spring-actuated means ineffective, and common means for actuating said mechanism and for moving said plurality of means into and out of positions wherein they are operable by the keys.

9. In an apparatus of the kind described, a plurality of type bars, a plurality of key bars for operating said type bars, a plurality of keys, spring-actuated means controlled by the keys for actuating the key bars, power driven means for tensioning the springs of said spring-actuated means, a plurality of means movable into positions wherein they are operable by said keys for actuating the key bars, and means for moving said plurality of means into and out of positions wherein they are operable by said keys.

10. In apparatus of the kind described, a plurality of type bars, a plurality of key bars for operating said type bars, a plurality of keys, spring-actuated means controlled by the keys for actuating the key bars, power driven means for tensioning the springs of said spring-actuated means, a plurality of means movable into positions wherein they are operable by said keys for actuating the key bars, and common means for moving said plurality of means into and out of positions wherein they are operable by said keys and for controlling said power driven means.

11. In a machine of the kind described and in combination, type bars, key levers for the type bars, type keys, a paper carriage, words spacing mechanism, means for shifting the carriage from one side of the machine to the other, means for locking said type keys against accidental operation, said locking means being controlled by the weight of the operator's hands, means controlled by the lifting of the operator's hands for automatically operating said spacing mechanism, and means controlled by movement of the operator's hands for shifting the paper carriage by actuation of the first-mentioned means.

12. In apparatus of the kind described, a movable paper carriage, a platen mounted thereon, a plurality of impression members, keys, spring-actuated means controlled by said keys for actuating the impression members, power driven means for tensioning the springs of the spring-actuated means, means independent of said spring-actuated means and controlled by the keys for actuating said impression members, a movable hand rest adjacent the keys, means controlled by said movable hand rest for locking said spring-actuated means to prevent accidental operation thereof, means for rendering said spring-actuated means functionally inoperative, and means controlled by the movable hand rest for returning the paper carriage to a position wherein a new line of writing may be commenced upon the paper.

13. In apparatus of the kind described, a movable paper carriage, a platen mounted thereon, a plurality of impression members, keys, spring-actuated means controlled by said keys for actuating the impression members, power driven means for tensioning the springs of the spring-actuated means, means independent of said spring-actuated means and controlled by the keys for actuating said impression members, a movable hand rest adjacent the keys, means controlled by said movable hand rest for locking said spring-actuated means to prevent accidental operation thereof, means for rendering said spring-actuated means functionally inoperative, means controlled by the movable hand rest for returning the paper carriage to a position wherein a new line of writing may be commenced upon the paper, and means controlled by the movable hand rest for shifting the carriage to space between words of writing impressed upon the paper.

14. In apparatus of the kind described, a plurality of type bars, a plurality of key bars for operating the type bars, a plurality of keys, a plurality of mechanisms operatively connecting said keys to said key bars, each of said plurality of mechanisms comprising a pivoted lever, a member pivotally mounted on each lever, means for yieldingly holding each member in a predetermined position relative to its associated lever, a plurality of springs for angularly displacing said levers, pivotally mounted means engageable with said members for displacing said levers to tension said springs, and power driven means for oscillating said pivotally mounted means.

In testimony whereof, I have hereunto signed my name.

DANIEL W. SHIEK.